United States Patent
Sato et al.

(10) Patent No.: US 7,350,775 B2
(45) Date of Patent: Apr. 1, 2008

(54) METHOD OF MANUFACTURING A FLUID-FILLED CYLINDRICAL DAMPING ASSEMBLY

(75) Inventors: Yuji Sato, Komaki (JP); Kazuhiko Kato, Komaki (JP)

(73) Assignee: Tokai Rubber Industries, Ltd., Komaki-Shi (JP)

(*) Notice: Subject to any disclaimer, the term of this patent is extended or adjusted under 35 U.S.C. 154(b) by 0 days.

(21) Appl. No.: 11/687,237

(22) Filed: Mar. 16, 2007

(65) Prior Publication Data
US 2007/0235912 A1   Oct. 11, 2007

(30) Foreign Application Priority Data
Mar. 27, 2006  (JP) .............................. 2006-084797

(51) Int. Cl.
*F16M 5/00* (2006.01)
(52) U.S. Cl. ................................. 267/140.12
(58) Field of Classification Search . 267/140.11–141.7
See application file for complete search history.

(56) References Cited

U.S. PATENT DOCUMENTS

| | | | | |
|---|---|---|---|---|
| 4,702,346 A | * | 10/1987 | Uno et al. .................. 181/207 |
| 4,936,557 A | * | 6/1990 | Schwerdt ................. 267/141.2 |
| 5,356,121 A | * | 10/1994 | Ikeda ..................... 267/140.12 |
| 5,413,319 A | * | 5/1995 | Hein et al. .............. 267/140.12 |
| 5,595,373 A | * | 1/1997 | Ikeda ..................... 267/140.12 |
| 5,690,320 A | * | 11/1997 | Kanda .................... 267/140.12 |
| 7,198,258 B2 | * | 4/2007 | Sato et al. ............. 267/140.13 |
| 2004/0004317 A1 | * | 1/2004 | Hatano et al. ......... 267/140.12 |

FOREIGN PATENT DOCUMENTS

| | | |
|---|---|---|
| JP | 05-332393 A1 | 12/1993 |
| JP | 10-047420 A1 | 2/1998 |
| JP | 11-153180 A1 | 6/1999 |
| JP | 2000-170823 A1 | 6/2000 |
| JP | 2005-163840 A1 | 6/2005 |

\* cited by examiner

*Primary Examiner*—Christopher P Schwartz
(74) *Attorney, Agent, or Firm*—Burr & Brown (57) ABSTRACT

A method of manufacturing a fluid-filled cylindrical damping assembly having sufficiently large extraction-resisting force in an axial direction of a metallic shaped product and an intermediate sleeve by the process following. There is provided a sealing rubber layer at an inner circumferential surface of the metallic shaped product having a tapered cylindrical shape where the inner flange portion is provided at an end portion of a small-diameter side. At least one concave groove is formed at an inside surface of an inner flange portion The metallic shaped product is inserted on an outer circumferential surface of an intermediate molded-body in a non-compressible fluid, and is diameter-reduced so as to be fitted and fixed. A large-diameter side end portion of the metallic shaped product is radially inwardly bent to form an engaging portion, and the engaging portion is engaged with a large-diameter side end portion of the intermediate sleeve.

3 Claims, 9 Drawing Sheets

METHOD OF MANUFACTURING A FLUID-FILLED CYLINDRICAL DAMPING ASSEMBLY

The present application is based on Japanese Patent Application No. 2006-084797 filed Mar. 27, 2006, the contents of which are incorporated hereinto by reference.

BACKGROUND OF THE INVENTION

1. Field of the Invention

The present invention relates to a method of manufacturing a fluid-filled cylindrical damping assembly, and more particularly to an advantageous method of manufacturing a fluid-filled cylindrical damping assembly which is capable of exhibiting a damping effect on the basis of flows of a fluid therein advantageously with respect to inputted vibrations applied in an axial direction and which may be preferably used as a member mount for a suspension system of an automobile, for example.

2. Description of the Related Art

Conventionally, there is known a so-called fluid-filled cylindrical damping assembly, constructed such that a far excellent damping characteristic can be exhibited on the basis of flows such as resonance or the like of a fluid therein. Such a fluid-filled cylindrical damping assembly is interposed between two members constituting a vibration transmitting system, and known as a kind of damping assembly forming a damping connection of both the members. (refer to JP-A-5-332393).

In the conventional fluid-filled cylindrical damping assembly, for example, an intermediate sleeve (outer cylindrical member) disposed radially outwardly of a shaft member with a suitable distance and the shaft member to be attached to one of the two members in the vibration transmitting system configured to form the damping connection, are connected via a main elastic rubber body disposed therebetween, and an outer cylindrical metal member (outer-inserting cylindrical metal member) to be attached to the other of the two members, to be configured to form the damping connection, is inserted on the outer circumferential surface of the intermediate sleeve via a thin-walled sealing rubber layer which is disposed on an inner circumferential surface of the outer cylindrical metal member, and is fitted and fixed to the intermediate sleeve. A plurality of pocket portions opened in an outer circumferential surface are formed in the main elastic rubber body, and by means of that the openings of the pocket portions is covered with the outer cylindrical metal member, a plurality of fluid chambers filled with a non-compressible fluid whose at least a part of wall is defined by the main elastic rubber body and the sealing rubber layer are provided between the outer cylindrical metal member and the shaft member. The thus described fluid-filled cylindrical damping assembly is used as a member mount for a suspension system of an automobile, a strut bar cushion, a suspension upper support, or the like, for example.

In the conventional fluid-filled cylindrical damping assemblies described above, there has been disclosed a structure in which, while an inner flange portion is integrally formed at one end portion of one side in an axial direction of the outer cylindrical metal member, an engaging portion radially inwardly bent in a radial direction is provided at an end portion of the other side thereof, and in which each of the inner flange portion and the engaging portion is in engagement with both side end portions of an intermediate sleeve in an axial direction, respectively. (for example, refer to JP-A-10-47420) In the thus described fluid-filled cylindrical damping assembly, resistance force against extracting or pulling out force in the axial direction applied between the outer cylindrical metal member and the intermediate sleeve, namely extraction-resisting force in the axial direction of the outer cylindrical metal member and the intermediate sleeve can sufficiently be secured.

When the thus described fluid-filled cylindrical damping assembly is manufactured, in general, an intermediate molded-body in which the shaft member and the intermediate sleeve are connected by the main elastic rubber body is formed first. Further, the outer cylindrical metal member is formed in which the inner flange portion is integrally formed at the end portion of one side in the axial direction, and the thin-walled sealing rubber layer is disposed on the inner circumferential surface. Then, the outer cylindrical metal member is inserted on an outer circumferential surface of the intermediate molded-body, in the non-compressible fluid, and an inside surface of the inner flange portion of the outer cylindrical metal member is brought into contact and engaged with an end surface of one side of the intermediate sleeve in an axial direction, and to be in engagement therewith, and thus, the outer cylindrical metal member and the intermediate molded-body are assembled. Thereafter, a diameter-reducing operation such as an eight drawing dies or the like is performed for the outer cylindrical metal member so that the outer cylindrical metal member is fitted on and fixed to the intermediate sleeve. An end portion of the outer cylindrical metal member at a side opposite to the side, at which the inner flange portion is caused to be radially inwardly bent and the engaging portion is formed at the end portion. The engaging portion is engaged with the end portion of the intermediate sleeve. Thus, the intended fluid-filled cylindrical damping assembly is obtained.

Under the aforementioned condition, the inventors of the present invention have made a study on the conventional fluid-filled cylindrical damping assembly from various angles. As a result, it becomes apparent that in the conventional fluid-filled cylindrical damping assembly, a manufacturing efficiency is inevitably deteriorated in mass production.

That is, in a case that the fluid-filled cylindrical damping assembly is mass-produced by the conventional manufacturing method as described above, ordinarily, a plurality of outer cylindrical metal members are set to one vulcanization mold, and in this condition, sealing rubber layers are vulcanized on the inner circumferential surfaces of the respective outer cylindrical metal members at the same time. At this moment, since the inner flange portion is provided at one end portion in the axial direction of the outer cylindrical metal member, a portion of the mold intruded in a center hole of the outer cylindrical metal member has to be extracted only from the other side in the axial direction of the outer cylindrical metal member, when the sealing rubber layer is demolded after performing the vulcanization-molding operation. Therefore, sliding resistance between an outer circumferential surface of the portion of the mold and the inner circumferential surface of the outer cylindrical metal member becomes extremely large. As a result, the demolding operation for the outer cylindrical metal member from the mold for vulcanization becomes difficult and causes a below mentioned problems. That is, the manufacturing efficiency for forming the plurality of outer cylindrical metal members at one time and the manufacturing efficiency in the mass production for producing the intended fluid-filled cylindrical damping assembly are deteriorated.

To solve these problems, the inventors of the present invention have made an idea to apply an extracting or pulling out slope to the outer cylindrical metal member by means of forming the same having a tapered cylindrical shape where a diameter thereof is gradually increased along the axial direction from one side to the other side. That is, a demolding capability of the outer cylindrical metal member can be increased by applying the extracting slope.

Although the manufacturing efficiency for the outer cylindrical metal member is certainly increased due to the improvement of the demolding capability when the fluid-filled cylindrical damping assembly is practically manufactured using the outer cylindrical metal member having the tapered cylindrical shape, the main elastic rubber body constituting a part of the wall portion of the fluid chamber is partially expanded when the outer cylindrical metal member is inserted on the outer circumferential surface of the intermediate molded-body in the non-compressible fluid, and the diameter-reducing operation on the outer cylindrical metal member is performed after assembling the same in a manufacturing process for the intended fluid-filled cylindrical damping assembly. Thereby, it becomes clear that a bad influence is affected to a damping characteristic or durability, and further that there may be caused damage at the expanded portion of the main elastic rubber.

SUMMARY OF THE INVENTION

The present invention has been made under the background of the above-described circumstances. Therefore, an object of the invention is to provide a method of manufacturing a fluid-filled cylindrical damping assembly, in which the fluid-filled cylindrical damping assembly capable of securing the extraction-resisting force in a sufficient amount in the axial direction of the outer cylindrical metal member and the intermediate sleeve can be advantageously mass-produced with excellent manufacturing efficiency without losing damping characteristic or durability in use.

To solve the above-described problems, the inventors of the present invention have ascertained the cause of the partial expansion of the main elastic rubber body constituting the part of the wall portion of the plurality of fluid chambers when the outer cylindrical metal member having the tapered cylindrical shape is inserted on the outer circumferential surface of the intermediate molded-body in the non-compressible fluid, and followed by a diameter-reducing operation on the outer cylindrical metal member after assembling the same. As a result, the inventors have reached a conclusion as described below.

That is, when the outer cylindrical metal member is assembled with the intermediate molded-body in a condition in which the outer cylindrical metal member is in contact with or in engagement with an end surface of the intermediate sleeve at the inner flange portion thereof in the non-compressible fluid, an escape way or gap allowing the flow of the fluid is formed between an end portion of a large-diameter side of the outer cylindrical metal member opposite to a side where the inner flange portion is formed, and an end portion of the intermediate sleeve at a side opposite to a side where the intermediate sleeve and the inner flange portion are in engagement with each other. Whereby, in a process of the diameter-reducing operation on the outer cylindrical metal member, the fluid between the outer cylindrical metal member and the shaft member is caused to escape toward outside through the escape way along with a gradual increase of a diameter-reducing amount of the outer cylindrical metal member. Thereafter, by performing the diameter-reducing operation, and an engaging portion being inwardly bent in the radial direction is formed at the large-diameter side of the end portion of the outer cylindrical metal member. When the engaging portion is engaged with the intermediate sleeve, the escape way is closed. At this moment, the fluid in an amount more than that of the fluid to be filled in the fluid chamber is caused to remain between the outer cylindrical metal member and the shaft member without the escape way. However, the remaining amount of the fluid is considered to be the amount corresponding to a capacity of the gap formed between the inner circumferential surface of the outer cylindrical metal member and the intermediate sleeve, and therefore when the outer cylindrical metal member is formed to have a tapered shape, the remaining amount of the fluid is inevitably increased more than that when the same is formed to have a straight cylindrical shape. Accordingly, in a case that the outer cylindrical metal member is formed to have a tapered shape, fluid pressure in the fluid chamber is excessively increased during the time the outer cylindrical metal member is further diameter-reduced from a condition in which the engaging portion is engaged with the intermediate sleeve, until the outer cylindrical metal member is completely fitted and fixed onto the intermediate sleeve. As a result, the main elastic rubber body defining the part of the wall portion of the fluid chamber may partially be expanded. The inventors have found the cause as described above.

Further, the inventors of the present invention found that the partial expansion of the main elastic rubber body can be eliminated or suppressed resulting from the above-described conclusion. That is, a second escape way for allowing the flow of the fluid is also formed between the outer cylindrical metal member and the intermediate sleeve, in particular, between the end portion of the outer cylindrical metal member at a side, where the inner flange portion is formed, and the end portion of the intermediate sleeve at a side to be engaged with the inner flange portion, when the outer cylindrical metal member is assembled with the intermediate molded-body in the non-compressible fluid, in addition to the above-described escape way (first escape way). Furthermore, even after the first escape way is closed due to that the engaging portion is formed in the outer cylindrical metal member by performing the diameter-reducing operation, and the outer cylindrical metal member is engaged with the intermediate sleeve, the second escape way is configured not to be closed. Thereby, the amount of the fluid caused to remain without escape way between the outer cylindrical metal member having the tapered shape and the shaft member, in an amount larger than that to be filled in the fluid chamber, is inevitably reduced.

Accordingly, the present invention is completed resulting from a further study on the basis of the aforementioned knowledge of the inventors and the gist is the following; in which a method of manufacturing a fluid-filled cylindrical damping assembly including a shaft member, an intermediate sleeve disposed radially outwardly of the shaft member with a predetermined radial spacing therebetween, a main elastic rubber body interposed between the shaft member and the intermediate sleeve, and connecting the shaft member and the intermediate sleeve, an outer cylindrical metal member inserted on an outer circumferential surface of the intermediate sleeve, provided a sealing rubber layer on an inner circumferential surface thereof, and being fitted and fixed to the intermediate sleeve, an engaging portion formed by radially inwardly bending an end portion of one side in an axial direction of the outer cylindrical metal member, an inner flange portion integrally formed at an end portion of the other side in the axial direction of the outer cylindrical metal member, and a plurality of fluid chambers provided between the outer cylindrical metal member and the shaft member, defined at least a part of a wall portion thereof by the main elastic rubber body and the sealing rubber layer, and filled with a non-compressible fluid; wherein the engaging portion is engaged with end portion of one side in an axial direction of the intermediate sleeve, while the inner flange portion is contacted to and engaged with an end portion of the other side in the axial direction of the intermediate sleeve, is characterized in including the steps of, (a) providing an intermediate molded-body formed of an integrally vulcanized product in which the shaft member and the intermediate sleeve are connected by main elastic rubber body disposed therebetween, and in which the end portion of the other side in the axial direction of the intermediate sleeve is formed to have a diameter smaller than a diameter of the end portion of the one side in the axial direction of the intermediate sleeve, (b) providing a metallic shaped product having a tapered cylindrical shape to provide the outer cylindrical metal member, being formed so that the diameter thereof decreases gradually from the one side in an axial direction towards the other side, and in which the inner flange portion is integrally formed at the end portion of the small diameter side, (c) forming the sealing rubber layer on an inner circumferential surface of the metallic shaped product, (d) providing at least one concave groove at an inside surface of the inner flange portion of the metallic shaped product, respectively opening on an inside surface and at an inside in a radial direction, while extending in the radial direction, and (e) engaging the engaging portion with an end portion of a large-diameter side of the intermediate sleeve in the non-compressible fluid, including the steps of, inserting the metallic shaped product provided with the at least one concave groove, on an outer circumferential surface of the intermediate molded-body, contacting and engaging the inside surface of the inner flange portion of the metallic shaped product with an end surface of the small-diameter side of the intermediate sleeve in the intermediate molded-body, performing the diameter-reducing operation on the metallic shaped product after assembling the metallic shaped product and the intermediate molded-body, fitting and fixing the metallic shaped product on the intermediate sleeve, and forming the engaging portion by means of inwardly bending an end portion of the large-diameter side of the metallic shaped product in the radial direction.

In the method of manufacturing the fluid-filled cylindrical damping assembly according to the present invention, the extraction-resisting force in the axial direction of the outer cylindrical metal member and the intermediate sleeve can be secured at sufficient strength, since the outer cylindrical metal member is fitted and fixed to the intermediate sleeve in a condition in which the outer cylindrical metal member is respectively engaged with each of both side end portions in the axial direction of the intermediate sleeve, at the inner flange portion and the engaging portion respectively provided at both side end portions in the axial direction.

In the method according to the present invention, the sealing rubber layer is disposed on an inner circumferential surface of the metallic shaped product, and the metallic shaped product is formed to have the tapered cylindrical shape resulting in applying an extracting or pulling out slope. Thereby, the metallic shaped product to turn into the outer cylindrical metal member is prepared to exhibit high demolding capability at a time of the vulcanization molding operation on the sealing rubber layer. Accordingly, when such a metallic shaped product in the precursor form of an outer cylindrical metal member is prepared, a plurality of outer cylindrical metal members can be easily obtained at the same time with an excellent manufacturing efficiency.

In the method of manufacturing the fluid-filled cylindrical damping assembly according to the present invention, specifically, an intermediate molded-body including an intermediate sleeve whose end portion at a side engaging with the inner flange portion of the outer cylindrical metal member having a diameter smaller than that of an end portion at a side opposite thereto is used as the intermediate molded-body, and at least one concave groove is provided at an inside surface of the inner flange portion of the outer cylindrical metal member, respectively opening on an inside surface and at a radially inside, while extending in the radial direction, prior to performing the diameter-reducing operation on the outer cylindrical metal member in a condition in which the outer cylindrical metal member is assembled with the intermediate molded-body.

Accordingly, in the method according to the present invention, not only the above-described first escape way is formed between the end portion of the outer cylindrical metal member at a large-diameter side opposite to the side at which the inner flange portion is formed, and the end portion of the intermediate sleeve at the side opposite to the side to be engaged with the inner flange portion, when the outer cylindrical metal member is assembled with the intermediate molded-body in the non-compressible fluid, but also the above-described second escape way is formed between the end portion of the outer cylindrical metal member at a side where the inner flange portion is formed and the end portion of the intermediate sleeve at a side to be engaged with the inner flange portion by means of the at least one concave groove provided at the inside surface of the inner flange portion.

Further, since the end portion of the intermediate sleeve at the side to be engaged with the inner flange portion is formed to have a diameter smaller than that of the end portion at the side opposite thereto, the end portion of the outer cylindrical metal member at the side where the inner flange portion is formed, and the end portion of the intermediate sleeve at the side to be engaged with the inner flange portion are positioned so as to be spaced apart from each other in a radial direction, even after the first escape way is closed due to the process that the engaging portion is formed in the outer cylindrical metal member by the diameter-reducing operation on the outer cylindrical metal member in the non-compressible fluid, and the engaging portion is engaged with the intermediate sleeve. As a result, a condition, in which the fluid caused to remain between each of the end portions can be escaped toward an outside through the concave groove to be the second escape way, can stably be secured.

Accordingly, when the method according to the present invention is adopted, although the metallic shaped product is formed to have the tapered cylindrical shape, at a time when the diameter-reducing operation is performed for the metallic shaped product in the non-compressible fluid, an amount of the fluid trapped or confined between the outer cylindrical metal member and the shaft member, is reduced as much as possible. Therefore, a partial expansion of the main elastic rubber body can effectively be eliminated or suppressed.

Therefore, according to the method of manufacturing the fluid-filled cylindrical damping assembly according to the present invention, it can be advantageously mass-produced at an excellent manufacturing efficiency without losing an damping characteristic or durability and whose extraction-resistance force of the outer cylindrical metal member and the intermediate sleeve in an axial direction can be secured at a sufficient strength.

According to one preferred form of the present invention, the sealing rubber layer is provided with a predetermined thickness on the inside surface of the inner flange portion of the metallic shaped product, and the at least one concave groove is formed in a surface opposite to the inner flange portion side of the sealing rubber layer provided on the inside surface of the inner flange portion. According to the preferred form, the at least one concave groove can be formed on the inside surface of the inner flange portion at the same time when the sealing rubber layer is vulcanization-molded on the inner circumferential surface of the metallic shaped product. As a result, the number of the process for the intended fluid-filled cylindrical damping assembly can be decreased, and therefore the manufacturing efficiency for the fluid-filled cylindrical damping assembly can effectively be improved.

According to another preferred form of the present invention, wherein the diameter-reducing operation for the metallic shaped product, which is performed after performing an assembling operation of the metallic shaped product and the intermediate molded-body, is performed in a manner such that an end portion of the metallic shaped product at a side where the inner flange portion is formed is formed to have a diameter smaller than the diameter of the end portion at a side opposite thereto. According to the present form, it is enabled that the metallic shaped product is assuredly in close contact with the end portion of the intermediate sleeve at the side to be engaged with the inner flange portion, which is formed to have a small diameter by means of the diameter-reducing operation on the intermediate sleeve. As a result, a far excellent sealing capability can be secured.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DESCRIPTION OF THE PREFERRED EMBODIMENTS

Hereinbelow, embodiments according to the present invention will be explained in detail for far more concretely clarifying the present invention, with referring to the drawings.

Figure 1:
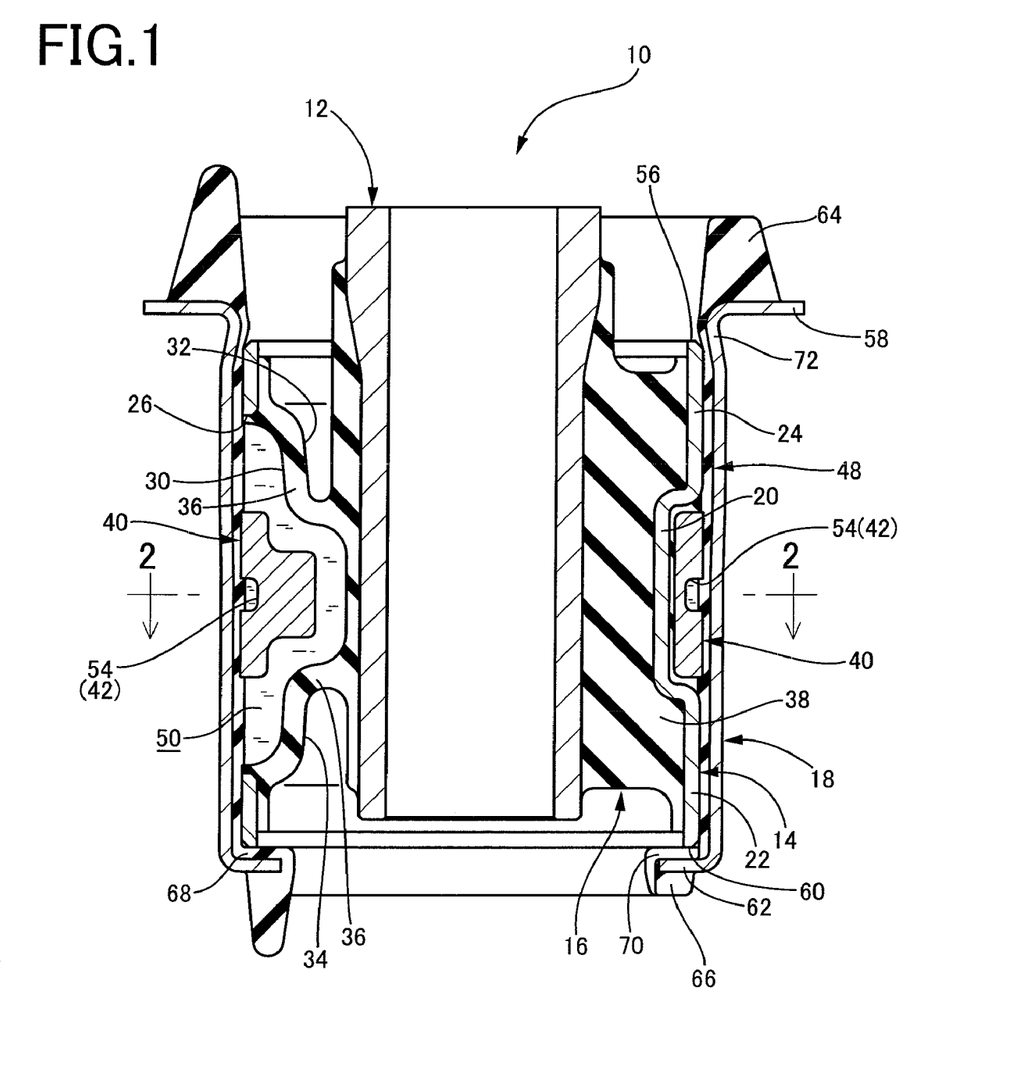
FIG. 1 is a longitudinal cross-section explanatory view showing an embodiment of a fluid-filled cylindrical damping assembly to be manufactured according to the present invention, taken along line 1-1 in FIG. 2.
Figure 2:
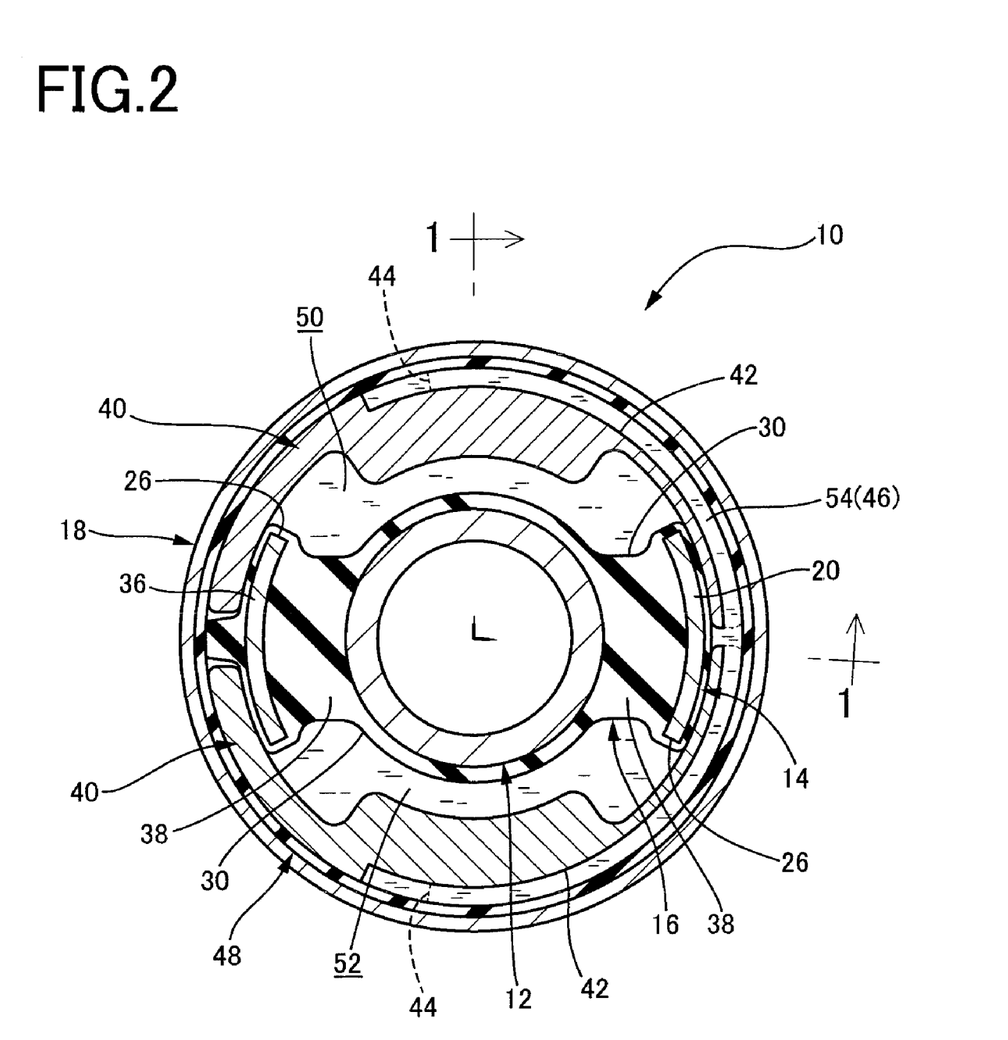
FIG. 2 is an explanatory cross-sectional view being taken along 2-2 in FIG. 1.

First, in FIGS. 1 and 2, a suspension member mount for an automobile, as an embodiment of a fluid-filled cylindrical damping assembly having a structure according to the present invention is schematically shown in a longitudinal cross-sectional view and a lateral cross-sectional view thereof, respectively. As is clear from the drawings, a suspension member mount 10 in the present embodiment is provided with a shaft member in the form of an inner metal sleeve 12 and an intermediate sleeve 14 disposed radially spaced apart with a predetermined distance with each other. Further, the suspension member mount 10 has a structure in which the inner metal sleeve 12 and the intermediate sleeve 14 are elastically connected by a main elastic rubber body 16 disposed therebetween. In addition, an outer cylindrical metal member in the form of an outer metal sleeve 18 is inserted on an outer circumferential surface of the intermediate sleeve 14, and fitted and fixed thereto.

Further, in the suspension member mount 10, not shown, the inner metal sleeve 12 is attached to a body side of a motor vehicle in a condition in which an upper and lower direction as seen in FIG. 1 corresponds to an upper and lower direction of the motor vehicle, and an upper and lower direction, and a left and right direction as seen in FIG. 2 corresponds to a forward and backward direction, and a left and right direction of the motor vehicle, respectively, whereas the outer metal sleeve 18 is attached to a suspension member mount 10. Thereby, the suspension member mount 10 is configured to be interposed in an attaching portion of the suspension member mount 10 to the body of the motor vehicle. Hereinafter, an upper and lower direction refers to an upper and lower direction in FIG. 1 unless otherwise specified.

Described more in detail, the inner metal sleeve 12 is configured such that the upper end portion in an axial direction has a thick-walled cylindrical shape. Further, the intermediate sleeve 14 made of metal is outwardly disposed in a coaxial manner so as to be spaced apart with a predetermined distance in a radial direction around the inner metal sleeve 12.

The intermediate sleeve 14 is a generally thin-walled cylindrical member with a relatively large diameter. The intermediate sleeve 14 has a circumferential groove extending continuously in its circumferential direction at an intermediate portion 20 thereof in the axial direction, thereby a relatively small diameter portion is provided. Further, in the intermediate sleeve 14, a lower end portion 22 in the axial direction sandwiching the intermediate portion 20 formed into the concave groove with an upper end portion 24 in the axial direction, is formed to have a diameter smaller than that of the upper end portion 24, and is formed to have a diameter larger than that of the intermediate portion 20 in the axial direction. Furthermore, at both side portions in the radial direction of the intermediate sleeve 14 corresponding to the forward and backward direction of the motor vehicle, a pair of window portions, 26 and 26, are formed into a cut formed configuration by cutting and opening a lower part of the upper end portion 24, an entirety of the intermediate portion 20, and an upper part of the lower end portion 22, and extending in a circumferential direction for a predetermined length of less than half an entire circumferential length of the intermediate sleeve 14.

Further, the main elastic rubber body 16 having substantially thick-walled cylindrical shape as a whole is interposed between the intermediate sleeve 14 and the inner metal sleeve 12 disposed radially spaced apart each other with a predetermined distance, and the inner metal sleeve 12 and the intermediate sleeve 14 are elastically connected by means of the main elastic rubber body 16. The main elastic rubber body 16 is vulcanized in a mold in which the inner metal sleeve 12 and the intermediate sleeve 14 are set. That is, the main elastic rubber body 16 is formed into an integrally vulcanized product in which the inner metal sleeve 12 is vulcanization-bonded to the inner circumferential surface of the main elastic rubber body 16 and the intermediate sleeve 14 is vulcanization-bonded to outer circumferential surfaces of the main elastic rubber body 16.

At both side portions in a radial direction of an intermediate portion in the axial direction of the main elastic rubber body 16, corresponding to the forward and backward direction of the motor vehicle (upper and lower direction in FIG. 2), there is formed a pair of pocket portions 30, 30 each in the form of circumferential groove extending in a circumferential direction for a predetermined length of less than half a circumferential length. Furthermore, the pair of the pocket portions 30, 30 open in an outer circumferential surface of the intermediate sleeve 14, respectively, through the corresponding window portions 26, 26 of the intermediate sleeve 14. In addition, at an upper end surface and a lower end surface of a forming portion where each of the pocket portions 30, 30, in the main elastic rubber body 16 is formed, there are formed an upper recessed portion 32 and a lower recessed portion 34 each having a predetermined depth and open on each of the end surfaces, respectively.

Thus, in a forming portion where each of the pocket portions 30, 30 is formed in the main elastic rubber body 16, partition-wall portions for partitioning each of the pocket portions 30, 30 and partitioning the upper recessed portion 32 and the lower recessed portion 34, is made as thin-walled portions 36. On the other hand, in the main elastic rubber body 16, each of portions that are sandwiched between the forming portions of each of the pocket portions 30, 30 in the circumferential direction, where the pocket portion 30 is not formed, are made as thick-walled portion 38, respectively. In other words, each of portions in the main elastic rubber body 16 positioned opposite to each other in a radial direction corresponding to the frontward and backward direction of the motor vehicle is made as the thin-walled portion 36, whereas each of portions in the main elastic rubber body 16 positioned opposite to each other in a radial direction corresponding to the left and right direction of the motor vehicle is made as the thick-walled portion 38.

Thereby, a relatively hard spring characteristics is exhibited in the radial direction corresponding to the left and right direction of the motor vehicle, and a resultant excellent steering stability can be secured and a relatively soft spring characteristic is exhibited in the radial direction corresponding to the frontward and backward direction of the motor vehicle, and improvement of the damping capability for harshness or the like can be intended. Accordingly, an excellent ride quality can be achieved.

Furthermore, a pair of orifice-forming members 40, 40 having the identical shape are assembled to the integrally vulcanized product formed by vulcanization-bonding the inner metal sleeve 12 and the intermediate sleeve 14 onto an inner and outer circumferential surfaces of the main elastic rubber body 16. The orifice-forming members 40, 40 have approximately semi annular shape as a whole, respectively, and concave grooves 42 continuously extending for a length slightly greater than half a circumferential length in a circumferential direction, while opening at an end surface of one end portion in a circumferential direction, is formed at a center portion in a width direction (axial direction) in an outer circumferential surface. Moreover, at approximately center portion in the circumferential direction in each of the orifice-forming members 40, there is formed a longitudinal groove 44 continuously extending toward the center portion in the width direction and being allowed to communicate with the concave grooves 42 at the center portion in the width direction, while opening at an end surface of one end portion in the width direction.

In addition, the pair of the orifice-forming members 40, 40 is fitted into the intermediate portion 20 of the intermediate sleeve 14, which is formed to have a relatively small diameter, from an opening direction side of corresponding window portions 26, 26 and assembled therewith in a condition, in which the pair of the orifice-forming members 40, 40 are opposed to each other at each of end surfaces in the circumferential direction where each concave groove 42 thereof is caused to open, and are disposed so that each of end surfaces in the width direction where each longitudinal groove 44 thereof is caused to open is positioned at a downside.

Thereby, each concave groove 42 of the pair of the orifice-forming members 40, 40 is connected in the circumferential direction, and there is formed a circumferential groove 46 extending for a length slightly greater than half a circumferential length in the circumferential direction, and being respectively allowed to communicate with the pair of the pocket portions 30, 30 in the main elastic rubber body 16 through each longitudinal groove 44 at both end portions in a length direction. In the present embodiment, a part of the main elastic rubber body 16 is formed so as to surround inner and outer circumferential surfaces of the intermediate portion 20 formed to have the relatively small diameter in the intermediate sleeve 14. Thereby, a portion of the main elastic rubber body 16 is interposed between each orifice-forming member 40 and the intermediate portion 20 to which the orifice forming member 40 is fitted, and assuring effective sealing between each orifice-forming member 40 and the intermediate portion 20.

Further, the outer metal sleeve 18, in which a thin-walled sealing rubber layer 48 is formed on an entire surface of an inner circumferential thereof, is inserted and fixed on an outer circumferential surface of the integrally vulcanized product where the pair of the orifice-forming members 40, 40 is assembled. Here, a lower end portion in the axial direction of the outer metal sleeve 18 is formed to have a diameter smaller than that of an upper end portion in the axial direction by a predetermined diameter.

Thus, the opening of the pair of the pocket portions 30, 30 is fluid-tightly covered, and the circumferential groove 46 formed by the orifice-forming members 40, 40 is also fluid-tightly covered. Thereby, a first fluid chamber 50 and a second fluid chamber 52 filled with a suitable non-compressible fluid, and an orifice passage 54 that allows the first fluid chamber 50 and the second fluid chamber 52 to communicate with each other are formed.

Figure 5:
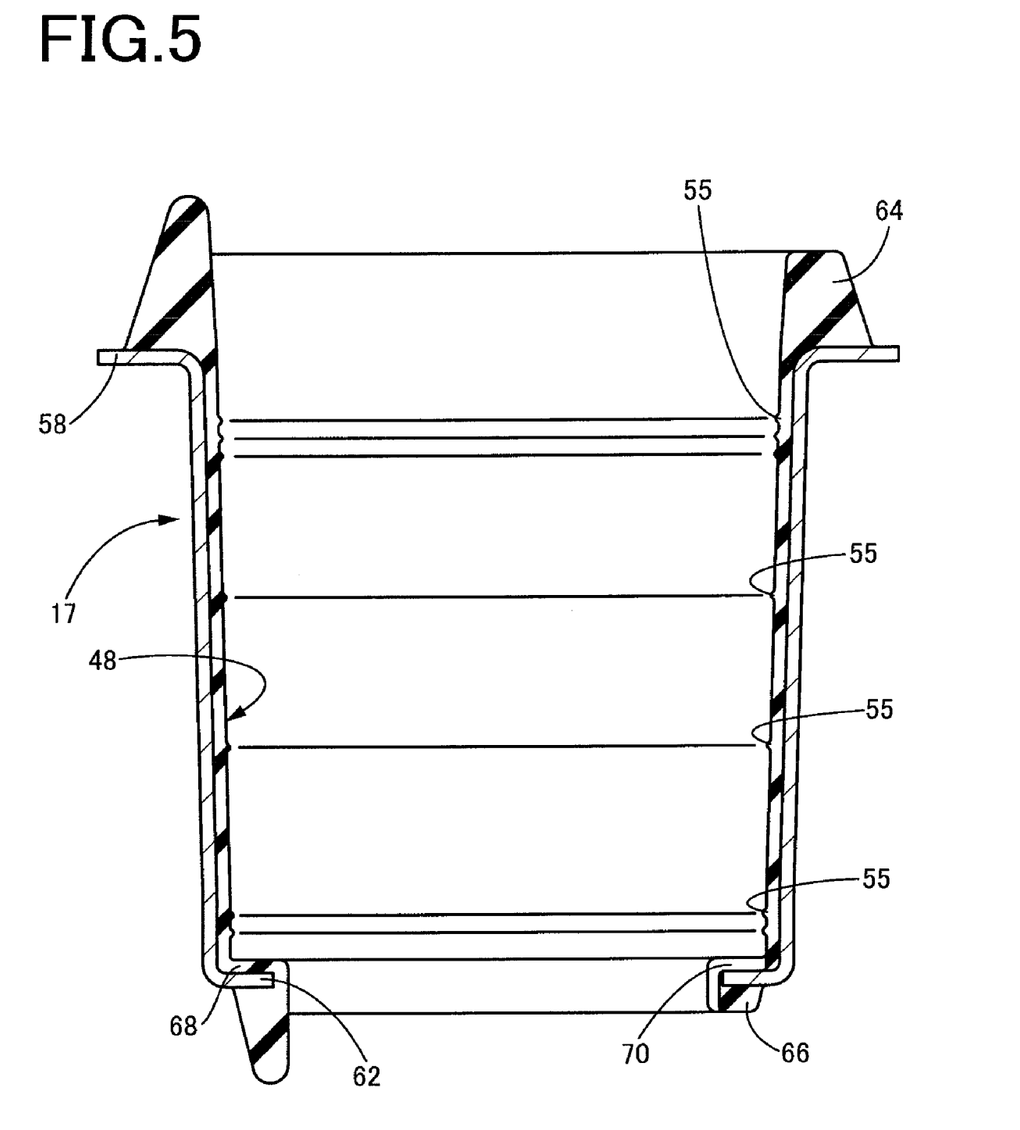
FIG. 5 is a view for explaining a step separately performed from the step shown in FIG. 3, showing a condition in which a metallic shaped product to be assembled with the intermediate molded-body is manufactured and prepared, corresponding to a cross-section 5-5 in FIG. 6.
Figure 7:
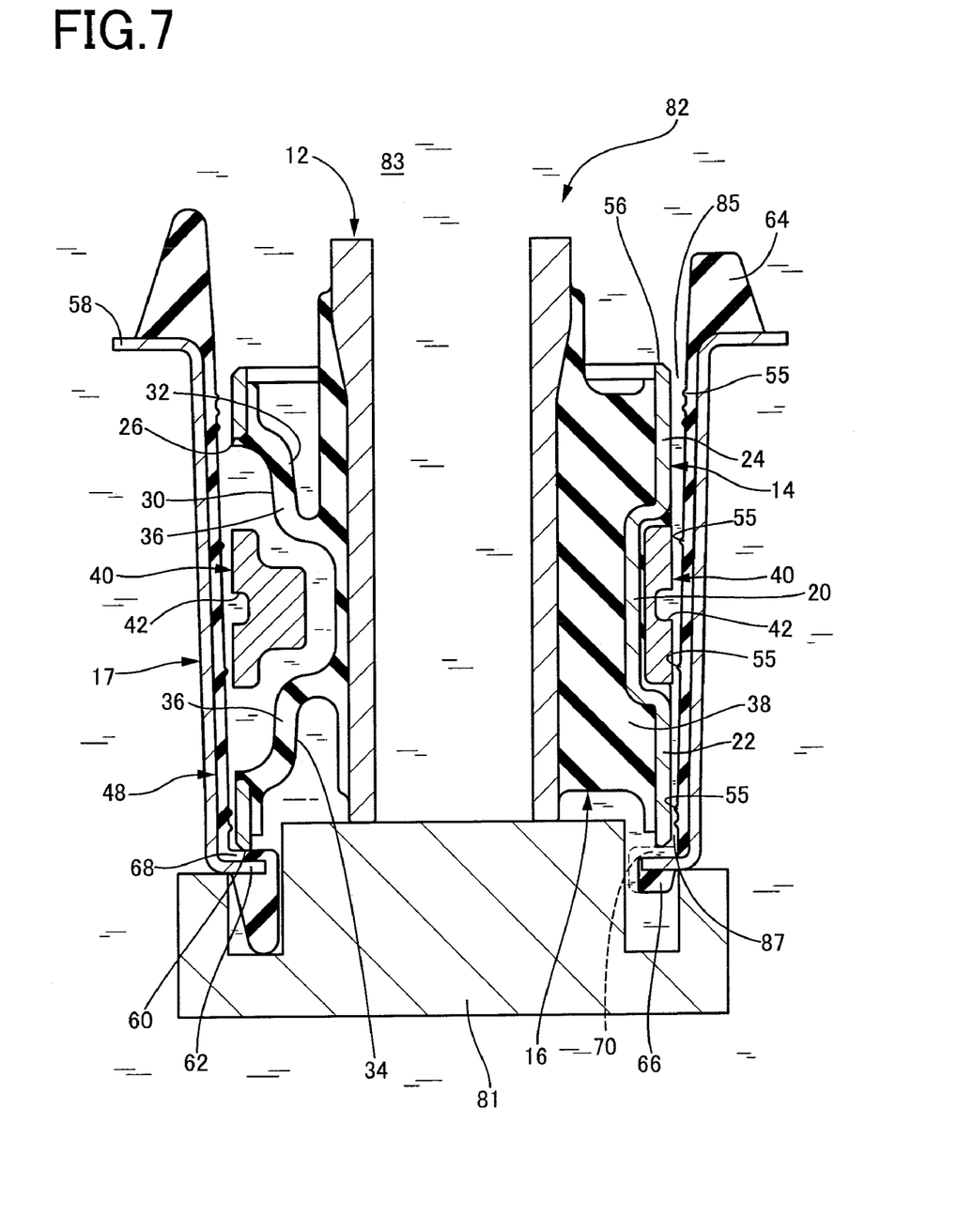
FIG. 7 is a view for explaining a step successively performed after the step shown in FIGS. 3 and 5, showing a condition in which the metallic shaped product is inserted on an outer circumferential surface of the intermediate molded-body and assembled therewith in a non-compressible fluid.

Referring to FIGS. 5 and 7, sealing projections (55) continuously extending in a circumferential direction with a predetermined distance in an axial direction each other are integrally formed, at a portion to be in contact with an upper outer circumferential surface of the upper end portion 24 having a relatively large diameter, a portion to be in contact with a lower outer circumferential surface of the lower end portion 22 having a smaller diameter than that of the portion above at the intermediate sleeve 14, and a portion to be brought into contact with an outer circumferential surface of the orifice-forming member 40, in an inner circumferential surface of the sealing rubber layer 48 formed on the inner circumferential surface of the outer metal sleeve 18. Thereby, a sealing capability between the outer metal sleeve 18 and the intermediate sleeve 14 is more sufficiently increased. In addition, as the non-compressible fluid to be sealed in the first and second fluid chambers 50, 52, for instance, water, alkylene glycol, polyalkylene glycol, silicone oil can be adopted. Specifically, so as to effectively obtain a damping effect on the basis of resonance of a fluid, a low-viscosity fluid having a viscosity of 0.1 Pa·s or less is preferably adopted.

Further, in the suspension member mount 10 of the present embodiment having such a structure, upon an application of vibration load in the axial direction between the inner metal sleeve 12 and the outer metal sleeve 18, relative internal pressure fluctuation is caused between the first fluid chamber 50 and the second fluid chamber 52 on the basis of elastic deformation of the thin-walled portion 36 of the main elastic rubber body 16. As a result, the fluid is forced to flow through the orifice passage 54 between the first fluid chamber 50 and the second fluid chamber 52, and thereby the damping effect can be exhibited on the basis of the resonance influence of the fluid. Further, in the combination of such an damping effect described above, and the damping effect obtained by the soft spring characteristic in the forward and back direction of the motor vehicle and the hard spring characteristic in the left and right direction of the motor vehicle described earlier, a far excellent ride quality can be realized. Incidentally, the damping effect on the basis of the resonance of the fluid can appropriately be tuned by means of controlling a length, cross-sectional area of fluid flow, or the like of the orifice passage 54.

In the above-described embodiment, a length (height) in the axial direction of the outer metal sleeve 18 is formed to be sufficiently larger that that of the intermediate sleeve 14. In addition, under a fitting and fixing condition of the outer metal sleeve 18 onto the intermediate sleeve 14, an outer flange portion 58 outwardly protruding by a predetermined dimension toward a direction perpendicular to the axial direction and continuously extending in the radial direction is integrally formed at a circumferential edge portion of an upper opening of the outer metal sleeve 18, which is situated nearer to an upside in relation to an upper end surface 56 of the upper end portion 24 of the intermediate sleeve 14 having a relatively large diameter. Further, under such a condition, an inner flange portion 62 inwardly protruding toward a direction perpendicular to the axial direction is integrally and circumferentially formed at a circumferential edge portion of a lower opening of the outer metal sleeve 18, which is situated nearer to a downside in relation to a lower end surface 60 of the lower end portion 22 of the intermediate sleeve 14.

That is, an upper end portion of the outer metal sleeve 18 is composed of an extending-out cylindrical wall portion extending out upward from the upper end surface 56 of the intermediate sleeve 14, and the outer flange portion 58 provided at a tip end thereof, and the lower end portion thereof is composed of an extending-out cylindrical wall portion extending out downwardly from the lower end surface 60 of the intermediate sleeve 14, and the inner flange portion 62 provided at a tip end thereof.

Further, a stopper rubber portion 64 protruding out with substantially mountain-like shape having a predetermined height is integrally formed with the sealing rubber layer 48 at an upper surface of the outer flange portion 58 in the outer metal sleeve 18. On the other hand, at a lower surface of the inner flange portion 62, a buffering rubber portion 66 protruding out with substantially mountain-like shape having a predetermined height is also integrally provided with the sealing rubber layer 48.

When a relatively large vibration load is inputted in the axial direction to the suspension member mount 10 mounted on the motor vehicle, each stopper rubber portion 64 and each buffering rubber portion 66 are brought into contact with a body of the vehicle, a stopper member, not shown, or the like provided in the body of the vehicle. Thereby, a relative displacement amount of the outer metal sleeve 18 to the inner metal sleeve 12 in the axial direction is limited.

Further, a connecting rubber portion 68 having a wall thickness corresponding to that of the extending-out cylindrical wall portion at the lower end portion of the outer metal sleeve 18 is formed at an upper surface of the inner flange portion 62. The buffering rubber portion 66 provided at a lower surface of the inner flange portion 62 and the sealing rubber layer 48 fixed to the inner circumferential surface of the outer metal sleeve 18 are connected with each other by means of the connecting rubber portion 68, and integrated. Thereby, the lower end surface 60 of the intermediate sleeve 14 is positioned to be opposed to an upper surface (inside surface) of the inner flange portion 62 via the connecting rubber portion 68. As a result, when extracting force that causes the outer metal sleeve 18 to be extracted upwardly in the axial direction, or extracting force that causes the intermediate sleeve 14 to be extracted downwardly in the axial direction is applied between the intermediate sleeve 14 and the outer metal sleeve 18, the extracting force mentioned above can be prevented on the basis of a engaging function of the connecting rubber portion 68 and the inner flange portion 62 to the lower end surface 60 of the intermediate sleeve 14.

Figure 6:
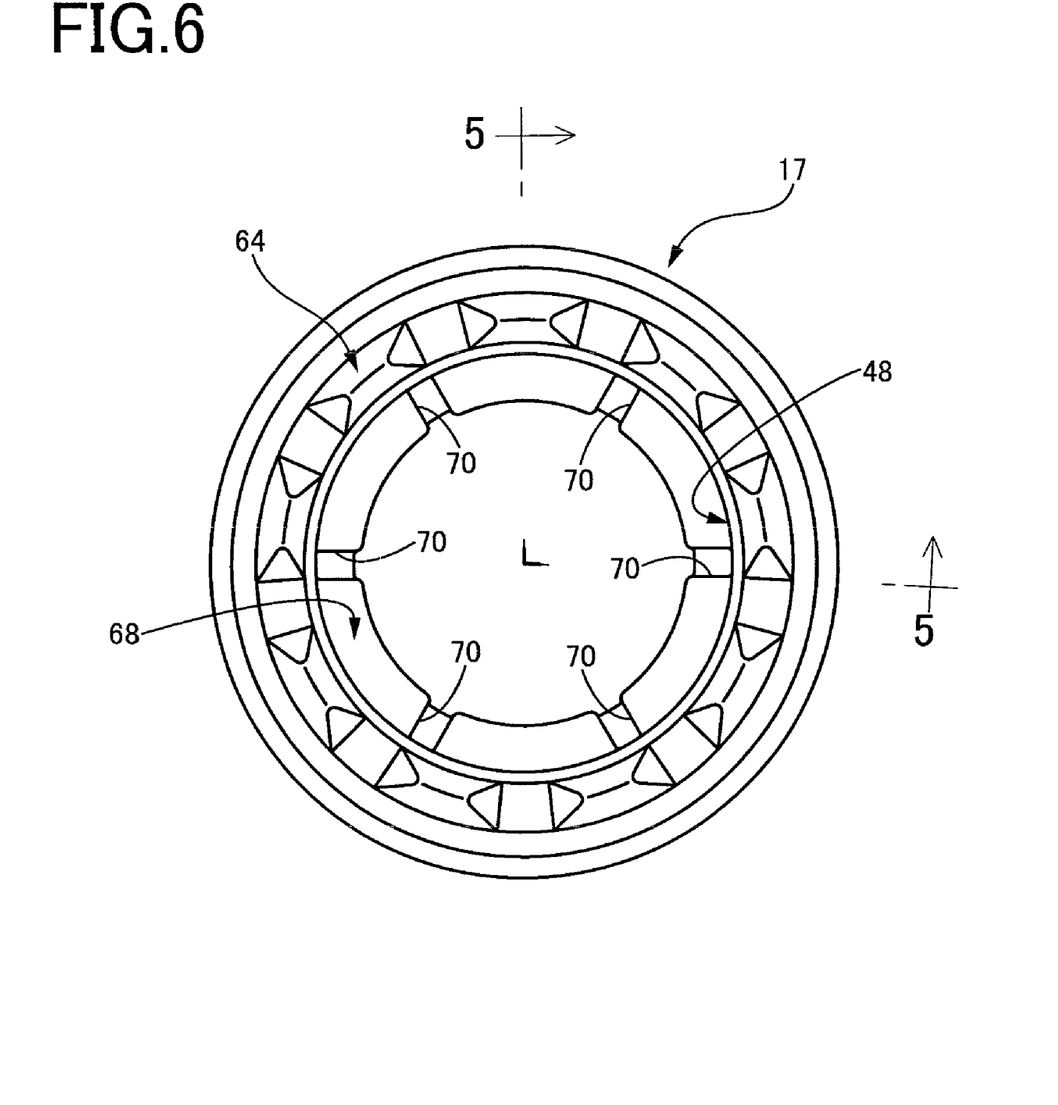
FIG. 6 is an explanatory plan view of FIG. 5.

Furthermore, each one of concave grooves 70 respectively opening at an upper surface of the connecting rubber portion 68 and at each of inner circumferential surfaces of the connecting rubber portion 68 and the buffering rubber portion 66, and continuously extending in a L-shape in a radial direction and a vertical direction, is formed, at each of a plurality of places (six places here) on a circumference at even intervals in a circumferential direction in the connecting rubber portion 68 mentioned above and the buffering rubber portion 66 continuing thereto (refer to FIG. 6).

Moreover, in the suspension member mount 10 of the present embodiment, an engaging convex portion 72 inwardly protruding out in the radial direction is formed so as to be continuously extending in a circumferential direction by the aforementioned extending-out cylindrical wall portion being inwardly bent in the radial direction and thereby concaved is provided in a manner at the extending-out cylindrical wall portion of the upper end portion of the outer metal sleeve 18. Further, the engaging convex portion 72 is engaged with the upper end surface 56 of the intermediate sleeve 14 in the radial direction via an interposing portion of the sealing rubber layer 48 interposed therebetween.

Thus, in the suspension member mount 10 described above, when the extracting force such as that the outer metal sleeve 18 to be extracted downwardly, or extracting force that causes the intermediate sleeve 14 to be extracted upwardly is applied between the intermediate sleeve 14 and the outer metal sleeve 18, effective resistance force against extracting force, namely extraction-resisting force can be exhibited at a sufficient strength between the intermediate sleeve 14 and the outer metal sleeve 18, on the basis of a engaging function of the interposing portion of the sealing rubber layer 48 and the engaging convex portion 72 to the upper end surface 56 of the intermediate sleeve 14.

Meanwhile, when the suspension member mount 10 having the structure described above is manufactured, a below mentioned method is preferably adopted, for example.

Figure 3:
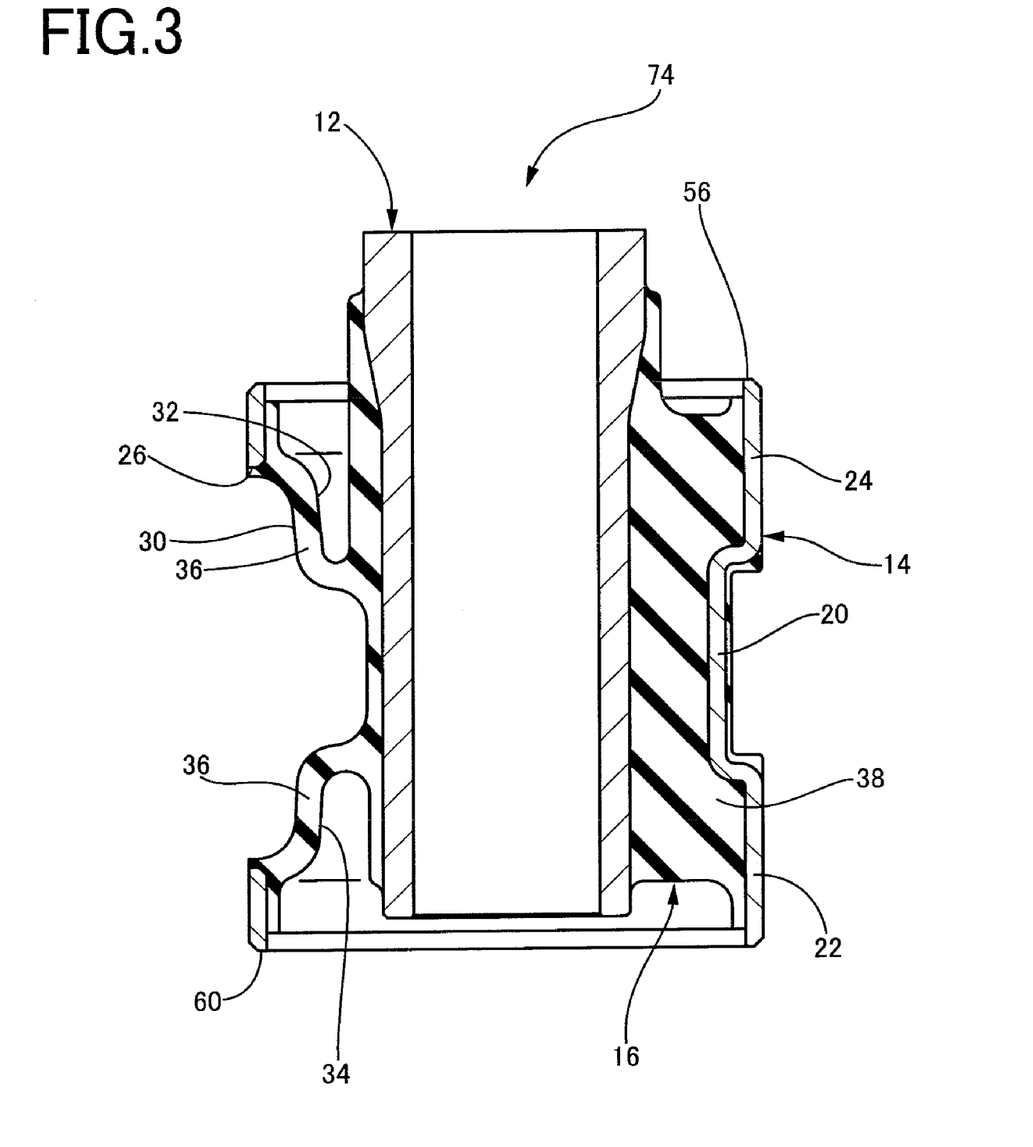
FIG. 3 is a view for explaining one step in manufacturing the fluid-filled cylindrical damping assembly shown in FIG. 1 according to the present invention, showing an integrally vulcanized product to provide an intermediate molded-body.

First, as shown in FIG. 3, an integrally vulcanized product 74, in which the inner metal sleeve 12 is vulcanization-bonded to the inner circumferential surface of the main elastic rubber body 16, and the intermediate sleeve 14 is vulcanization-bonded on the outer circumferential surfaces of the main elastic rubber body 16, is prepared by a known vulcanization-molding method. When molding the integrally vulcanized product 74, an intermediate sleeve, in which the two window portions 26, 26 are provided and which the upper end portion 24 and the lower end portion 22 in the axial direction are formed to have the same diameter, whereas the intermediate portion 20 in the axial direction is formed to have a relatively smaller diameter so as to be formed into a concave groove, is used as the intermediate sleeve 14.

Figure 4:
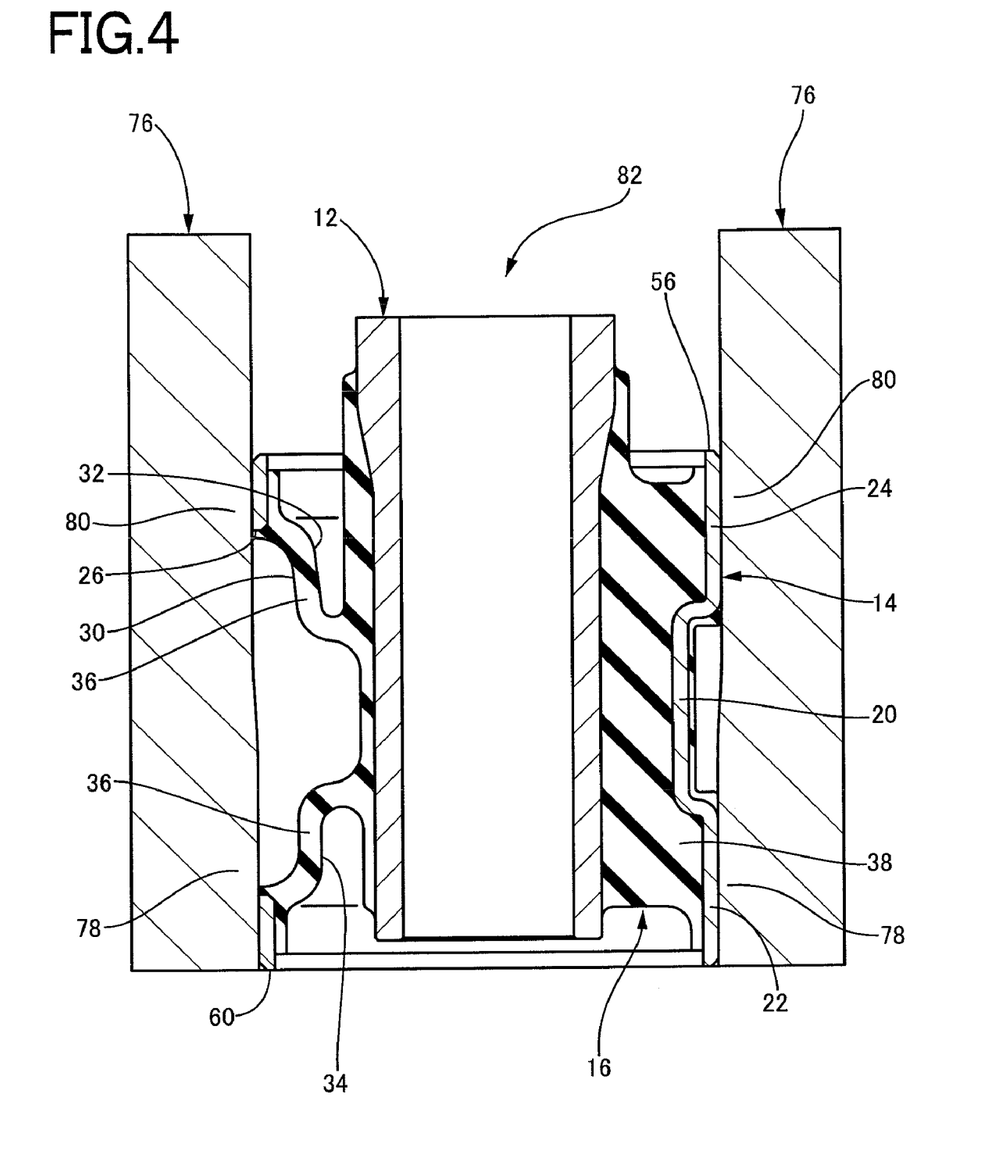
FIG. 4 is a view for explaining a step successively performed after the step shown in FIG. 3, showing a condition in which an intermediate molded-body whose lower side portion of an intermediate sleeve has a smaller diameter than an upper side portion of the same is formed by performing a drawing operation on the integrally vulcanized product.

Next, a diameter-reducing operation is performed on the intermediate sleeve 14 of the integrally vulcanized product 74 thus molded. The diameter-reducing operation is performed using a drawing die 76 that is generally used for an eight-way drawing operation, a sixteen-way drawing operation, or the like, as shown in FIG. 4, for example. Here, specifically, a drawing die, in which a contacting portion being in contact with the upper end portion 24 of the intermediate sleeve 14 serves as a large-diameter portion 80, whereas a contacting portion being in contact with the lower end portion 22 of the intermediate sleeve 14 serves as a small-diameter portion 78, is used as the drawing die 76 described above. Further, by means of that the diameter-reducing operation is performed on the intermediate sleeve 14 using the drawing die 76 described above, an intermediate molded-body 82 including the intermediate sleeve 14, whose lower end portion 22 is formed to have a diameter smaller than that of the upper end portion 24 of the intermediate sleeve 14 by a predetermined diameter, is formed from the integrally vulcanized product 74, and prepared.

When forming the intermediate molded-body 82, for example, the diameter-reducing operation using the drawing die 76 can previously be performed on the intermediate sleeve 14 before forming the integrally vulcanized product 74. Alternatively, the integrally vulcanized product 74 can also be formed by the lower end portion 22 so as to have a diameter smaller than that of the upper end portion 24 by a component rolling of a known plasticity processing, or the like, other than the drawing operation, and that the intermediate sleeve 14 is thereafter vulcanization-bonded with the main elastic rubber body 16 together with the inner metal sleeve 12. According to this method, the intermediate molded-body 82 is simultaneously formed with molding the integrally vulcanized product 74. The above-described method is specifically effective in a case that there is no need to apply a preliminary compressing operation on the main elastic rubber body 16.

On the other hand, separately from the preparation of the intermediate molded-body 82, a metallic shaped product 17 is prepared. Here, as shown in FIG. 5 (explanatory view of a 5-5 cross-sectional view in FIG. 6) and FIG. 6, the outer flange portion 58 and the inner flange portion 62 are integrally formed at an upper end portion and a lower end portion of the metallic shaped product 17, respectively, and the metallic shaped product 17 having an entire shape of a tapered cylinder, in which the diameter thereof decrease gradually from upside to downside, in the axial direction, is used as a precursor of the outer metal sleeve 18.

Consecutively from that, the thin-walled sealing rubber layer 48 is formed on an entire surface of the inner circumferential surface of the prepared metallic shaped product 17, by known vulcanization-molding method. Furthermore, at a time when the sealing rubber layer 48 is formed, the stopper rubber portion 64 is integrally formed with the sealing rubber layer 48 at an upper surface of the outer flange portion 58, and the connecting rubber portion 68 and the buffering rubber portion 66 are also integrally formed with the sealing rubber layer 48 at an upper surface (inside surface) and a lower surface (outside surface) of the inner flange portion 62 so as to surround the inner flange portion 62, respectively. Moreover, specifically, the concave grooves 70 extending across the connecting rubber portion 68 and the buffering rubber portion 66 are provided in the connecting rubber portion 68 and the buffering rubber portion 66, at even intervals in a circumferential direction in a plural number (six here).

Each of the concave grooves 70 is easily formed at the same time when the sealing rubber layer 48 is vulcanization-molded, by using a vulcanization mold on which a projecting concave groove forming portion having an outer shape corresponding to the concave groove 70 is provided at the time when the sealing rubber layer 48 integrally including each of the stopper rubber portion 64, the buffering rubber portion 66, and the connecting rubber portion 68 is vulcanization-molded. Further, the metallic shaped product 17 having a tapered cylindrical shape is used to provide the outer metal sleeve 18, in which a forming side of the inner flange portion 62 (a side where the inner flange portion 62 is formed) has a small-diameter side, and an extracting slope is applied. Therefore, although a mold portion brought into contact with the inner circumferential surface of the metallic shaped product 17 is extracted only from a side opposite to the inner flange portion 62 side at the time when the sealing rubber layer 48 is vulcanization-molded, an excellent demolding capability can be exhibited. Accordingly, a vulcanization-molding operation on the sealing rubber layer 48 for respective plurality of metallic shaped products 17 can be performed easily and simultaneously.

Next, as shown in FIG. 7, a pair of the orifice-forming members 40, 40 is assembled with the intermediate sleeve 14 of the intermediate molded-body 82, and thereafter, the intermediate molded-body 82 is inserted into an inside of the metallic shaped product 17 in a non-compressible fluid 83, through the upper opening portion of the metallic shaped product 17. In other words, the metallic shaped product 17 is inserted radially outwardly on an outer circumferential surface of the intermediate molded-body 82 in a non-compressible fluid 83. Thereafter, the same is supported by a supporting mount 81. Thus, by the outwardly inserting operation, the upper surface (inside surface) of the inner flange portion 62 of the metallic shaped product 17 is brought into contact with the lower end surface 60 of the intermediate sleeve 14 via the connecting rubber portion 68 and is caused to be engaged therewith. Further, each of the sealing projections 55 provided at the inner circumferential surface of the sealing rubber layer 48 is positioned respectively corresponding to the upper outer circumferential surface of the upper end portion 24 of the intermediate sleeve 14 and the lower outer circumferential surface of the lower end portion 22 of the same, and to the orifice forming member 40.

At this moment, a gap is formed over an entire circumference of the outer circumferential surface of the intermediate sleeve 14 and the inner circumferential surface of the metallic shaped product 17 therebetween. Further, in the gap described above, the gap formed between the end edge portion of the upper end portion 24, having a relatively large diameter, of the intermediate sleeve 14 and the lower portion of the upper end portion of the metallic shaped product 17, which is situated nearer to a downside in relation to the outer flange portion 58 serves as a first escape way 85 allowing a portion between the intermediate molded-body 82 and the metallic shaped product 17 to communicate with an outside at an upper side thereof. Further, the gap formed between the end edge portion of the lower end portion 22, having a relatively small diameter, of the intermediate sleeve 14 and the upper portion of the lower end portion of the metallic shaped product 17, which is situated nearer to an upside in relation to the inner flange portion 62 serves as a second escape way 87 allowing a portion between the intermediate molded-body 82 and the metallic shaped product 17 to communicate with an outside at a lower side thereof through the aforementioned plurality of concave grooves 70 provided while continuously extending in the connecting rubber portion 68 and the buffering rubber portion 66 surrounding the inner flange portion 62 of the metallic shaped product 17.

Figure 8:
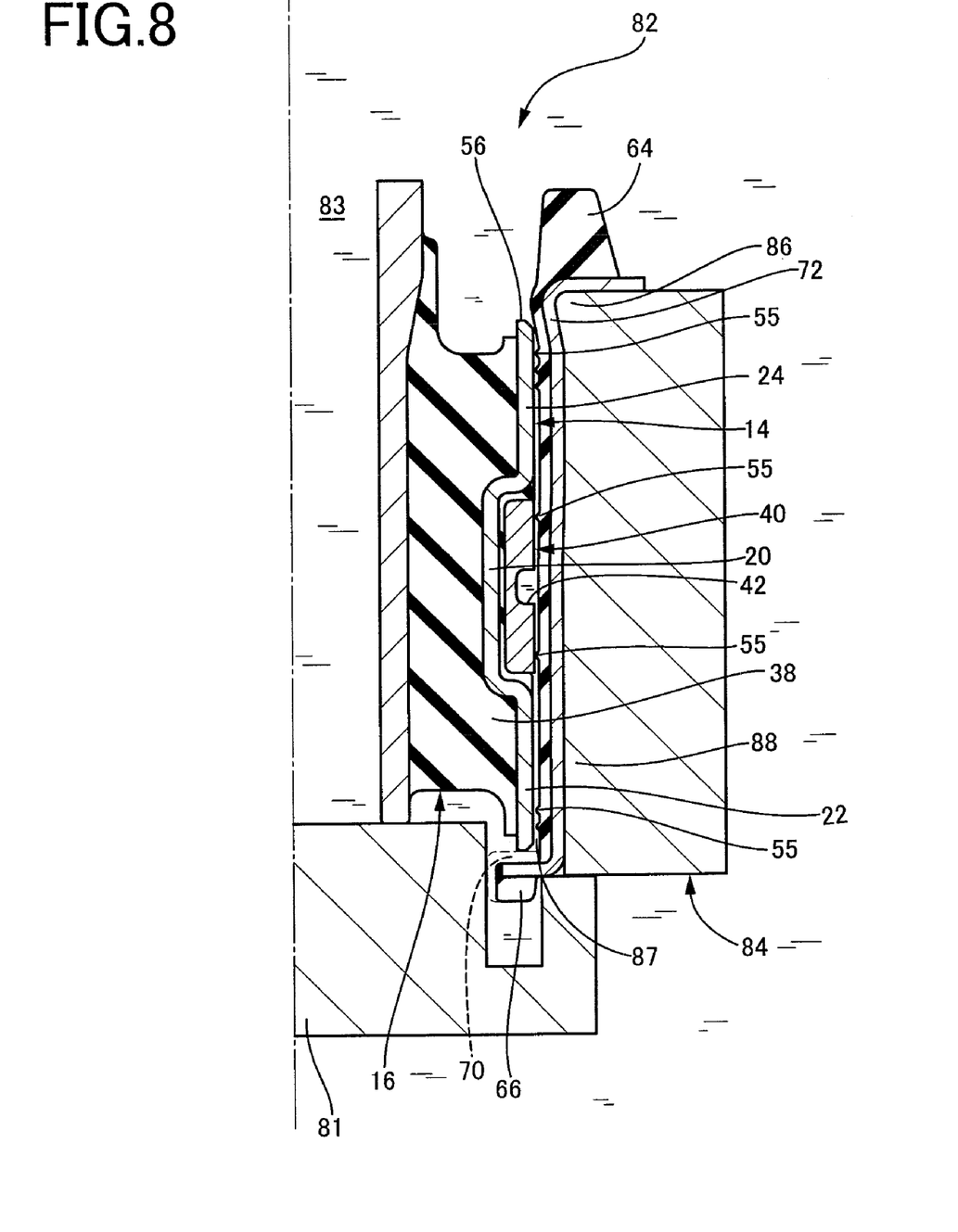
FIG. 8 is a view for explaining a step successively performed after the step shown in FIG. 7, showing a condition in which a drawing operation is performed on the metallic shaped product assembled with the intermediate molded-body.

Thereafter, the diameter-reducing operation is performed on the metallic shaped product 17. This diameter-reducing operation can advantageously be performed by means of applying compression force to the metallic shaped product 17 from the outer circumferential surface toward inside in the radial direction, by performing an eight-way drawing operation, a sixteen-way drawing operation, or the like, using the predetermined drawing die 84 in the non-compressible fluid 83, as shown in FIG. 8, for example. In addition, the diameter-reducing operation is performed on the metallic shaped product 17 by the drawing operation (diameter-reducing operation), and a pair of the orifice forming members 40, 40 is fitted to and fixed to the intermediate sleeve 14 fluid-tightly and the intermediate sleeve 14 is fitted to and fixed to the metallic shaped product 17 fluid-tightly. Thereby, the intermediate sleeve 14 and the metallic shaped product 17 are fixedly assembled and at the same time, the first and second fluid chambers (50), (52) are formed.

At this time point, at an upper end portion of the drawing die 84, a drawing projection 86 is formed to protrude radially inwardly from an inner circumferential surface thereof, and the upper end portion where the drawing projection 86 is formed is constructed to be able to have a larger drawing ratio thereof in a radial direction than that of other portions. Further, the drawing projection 86 mentioned above gradually protrudes toward the upper end portion of the drawing die 84 while being formed of an inclined surface. In addition, a protruding amount becomes the maximum at the upper end portion of the drawing die 84, and the drawing projection 86 has a cross-sectional shape so as to form a smooth curved surface at a tip end portion thereof, continuously in a circumferential direction of the drawing die 84. Further, the drawing die 84 includes a large-diameter portion 88 at a lower end side portion, which is formed to have a diameter larger than that of an upper end side portion other than the portion where the drawing projection 86 is formed, by a predetermined diameter.

Thus, here, a drawing operation is performed on the metallic shaped product 17 using the drawing die 84 as mentioned above. Thereby, the diameter is reduced at the upper end portion of the metallic shaped product 17 being in contact with the drawing projection 86 at a diameter-reducing ratio larger than that of any other portions. In addition, the diameter is reduced at a lower end portion of the metallic shaped product 17 being in contact with the large-diameter portion 88 of the drawing die 84, at a diameter-reducing ratio larger than that of an upper portion other than the upper end portion. As a result, as shown in FIG. 1, the engaging convex portion 72 is continuously formed in a circumferential direction at the extending-out cylindrical wall portion of the metallic shaped product 17 that is extending out upward from the upper end surface 56 of the intermediate sleeve 14. Further, the lower end portion of the metallic shaped product 17 is formed to have a smaller diameter than that of the upper end portion except the engaging convex portion 72.

In a diameter-reducing process for the metallic shaped product 17 mentioned above, the non-compressible fluid 83 other than the fluid filled in the pocket portion 30 of the main elastic rubber body 16, in the non-compressible fluid 83 that is filled between the intermediate molded-body 82 and the metallic shaped product 17 is caused to escape toward the outside from the gap between the intermediate molded-body 82 and the metallic shaped product 17 through the first escape way 85, the second escape way 87, and a plurality of the concave grooves 70 along a proceeding of the drawing (diameter-reducing) operation.

Moreover, the upper end portion of the metallic shaped product 17 is largely diameter-reduced by the drawing projection 86 by further proceeding of the drawing operation on the metallic shaped product 17, and the engaging convex portion 72 is formed at the upper end portion thereof, as shown in FIG. 8, and the first escape way 85 is closed when a portion of the sealing rubber layer 48 positioned at the inside of the engaging convex portion 72 is brought into contact with an end edge portion of the upper end portion 24 of the intermediate sleeve 14, accordingly an escape of the non-compressible fluid 83 through the first escape way 85 is inhibited.

Figure 9:
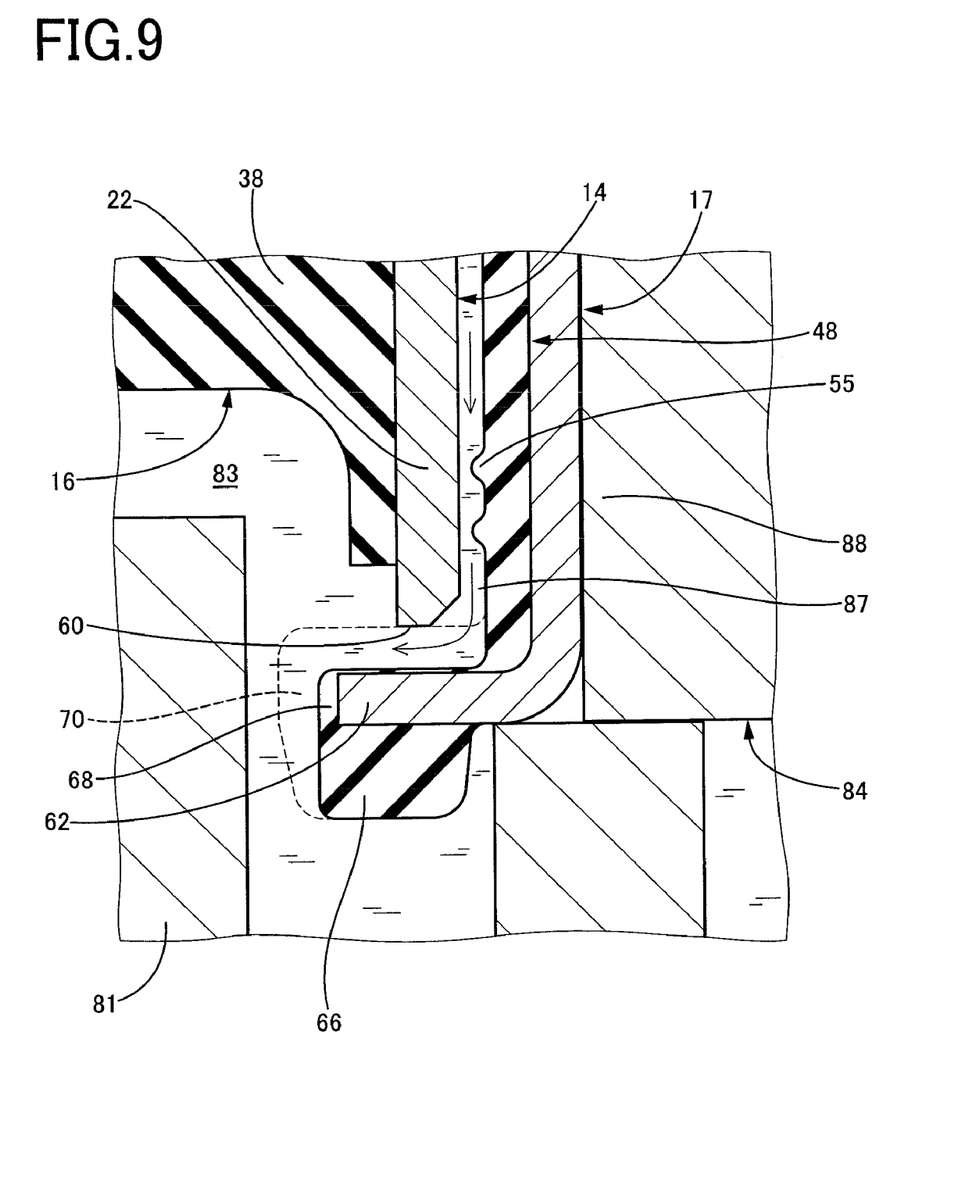
FIG. 9 is a partially enlarged explanatory view of FIG. 7.

However, since the lower end portion 22 of the intermediate sleeve 14 is formed to have a smaller diameter than that of the upper end portion 24, as is clear from FIGS. 8 and 9, even at a time point when the first escape way 85 is closed, the second escape way 87 is not closed and a communication with the outside through each of the concave grooves 70 is continuously maintained. Thereby, even after the first escape way 85 is closed, along with the proceeding of the drawing operation on the metallic shaped product 17, the non-compressible fluid 83 other than the fluid filled in the pocket portion 30 of the main elastic rubber body 16 is caused to escape toward the outside from the gap between the intermediate molded-body 82 and the metallic shaped product 17 through the second escape way 87 and each of the concave grooves 70.

Then, by a further proceeding of the drawing operation on the metallic shaped product 17, the second escape way 87 is also closed, when the lower end portion of the metallic shaped product 17 is far largely diameter-reduced compared to other portion except the engaging convex portion 72, and is brought into close contact with the lower end portion 22 of the intermediate sleeve 14 via the sealing rubber layer 48, and the gap between the inner circumferential surface of the metallic shaped product 17 and the outer circumferential surface of the intermediate sleeve 14 is fluid-tightly sealed. At this moment, an amount of the non-compressible fluid 83 existing in the gap between the metallic shaped product 17 and the intermediate molded-body 82 is configured to be sufficient to be housed in the first and second fluid chambers 50, 52. Further, a surplus amount of the non-compressible fluid 83 filled in each of the first and second fluid chambers 50, 52, is configured to be as little as possible.

By completion of the above-described drawing operation, the metallic shaped product 17 has turned into the outer metal sleeve 18 of the suspension member mount 10 shown in FIGS. 1 and 2. The intermediate molded-body 82 and the metallic shaped product 17 (the outer metal sleeve 18,) are fixedly assembled, and at the same time, the first and second fluid chambers (50), (52) are formed. Thus, the intended suspension member mount 10 is completed.

As described above, in the present embodiment, the engaging convex portion 72 of the outer metal sleeve 18 realizing an excellent extraction-resisting force in the axial direction between the outer metal sleeve 18 and the intermediate sleeve 14 can easily be formed by performing the drawing operation on the metallic shaped product 17, which is conventionally generally carried out for fitting and fixing the metallic shaped product 17 to the intermediate sleeve 14. As a result, the extraction-resisting force in the axial direction between the outer metal sleeve 18 and the intermediate sleeve 14 can advantageously be secured without performing any special processing or operation for forming the engaging convex portion 72.

Specifically, according to the present embodiment, owing to that the metallic shaped product 17 is formed to have a tapered cylindrical shape, the molding operation on the sealing rubber layer 48 for each of a plurality of the metallic shaped products 17 can easily be performed simultaneously. Therefore, a manufacturing efficiency of the metallic shaped product 17, in which the sealing rubber layer 48 is formed on the inner circumferential surface thereof, and the mass production efficiency of the intended suspension member mount 10 can effectively be increased.

In addition, in the present embodiment, although the metallic shaped product 17 is formed to have the tapered cylindrical shape as mentioned above, in the diameter-reducing process for the metallic shaped product 17, the excessive amount of the non-compressible fluid 83 filled in the gap between the metallic shaped product 17 and the intermediate molded-body 82 is sufficiently caused to escape toward the outside through the first escape way 85 and the second escape way 87 at a sufficient amount, and the surplus amount of the non-compressible fluid 83 filled in the first and second fluid chambers 50, 52 is configured to be as little as possible. Therefore, problems such as expansion or application of excessive load to the thin-walled portion 36 of the main elastic rubber body 16 constituting a part of the wall portion of the first and second fluid chambers 50, 52 caused by the surplus non-compressible fluid 83 can effectively be eliminated or suppressed.

Therefore, according to the thus described present embodiment, the suspension member mount 10, which can secure a sufficient amount of the extraction-resistance force between the outer metal sleeve 18 and the intermediate sleeve 14 in the axial direction and has an advantageously increased load-bearing characteristic in the axial direction, can advantageously be mass-produced with an excellent manufacturing efficiency without losing the damping characteristic or durability Further, in the present embodiment, since the concave groove 70 allowing the second escape way 87 to communicate with the outside is provided to continuously extend in the connecting rubber portion 68 and the buffering rubber portion 66, both integrally formed with the sealing rubber layer 48, in a manner so as to surround the inner flange portion 62 of the metallic shaped product 17, the concave groove 70 is formed at the same time when the sealing rubber layer 48 is formed onto the metallic shaped product 17. Therefore, there is no need to perform any specific operation for providing the concave groove 70 mentioned above, and a reduction of a number of process of the manufacture for the intended suspension member mount 10 is advantageously achieved. Thereby, the manufacturing efficiency of the suspension member mount 10 can further be effectively improved.

In addition, according to the present embodiment, since the lower end portion of the metallic shaped product 17 is largely diameter-reduced compared to other portion except the engaging convex portion 72 by the drawing operation on the metallic shaped product 17, it permits the lower end portion of the metallic shaped product 17 mentioned above to be in close contact with the lower end portion 22 of the intermediate sleeve 14 that is diameter-reduced in advance. As a result, a far excellent sealing can be secured.

As described above, one of embodiments of the present invention has been described in detail. However, the description is illustrative purpose only, and it is to be understood the present invention is not limited to the details of the illustrated embodiment.

For instance, the engaging convex portion 72 formed at the upper end portion of the outer metal sleeve 18 is not limited to the illustrated shape that is formed by concaving the lower portion of the outer flange portion 58. That is, for example, as described in JP-A-10-47420, a shape formed by only inwardly bending the upper end portion of the metallic shaped product 17 may be suitably employed.

Further, in the aforementioned embodiment, the concave groove 70 opening on an inside surface, and at an inside in a radial direction of the inner flange portion 62, and allowing the second escape way 87 to communicate with the outside is provided to continuously extend in the connecting rubber portion 68 and the buffering rubber portion 66 surrounding the inner flange portion 62. However, in a case such as that the connecting rubber portion 68 and the buffering rubber portion 66 are not provided in the inner flange portion 62, the concave groove 70 mentioned above may be directly formed onto the inner flange portion 62 by performing, for example, the plasticity processing for the inner flange portion 62.

A taper angle of the metallic shaped product 17 having the tapered cylindrical shape is not specifically limited and may be determined appropriately in consideration of the demolding capability or the like of the sealing rubber layer 48 for the metallic shaped product 17 at a time when the vulcanization-molding operation is performed.

The specific structure, such as the position, the number, the form, or the like of each of the fluid chambers 50, 52 or the orifice passage 54 is appropriately be determined corresponding to the required damping characteristic, for instance, and is not limited to the illustrated structure.

Further, the shaft member may employ a solid member other than the illustrated metal-made cylindrical member is used.

In addition, it is to be understood that the present invention can be applied to any methods for manufacturing a differential mount, a body mount, a sub-frame mount, a cab mount, a strut bar cushion, or the like other than the illustrated suspension member mount, and further, to a method of manufacturing a fluid-filled cylindrical damping assembly in various kinds of mechanical apparatuses or the like.

It is to be understood that the present invention may be embodied with various other modifications, changes, improvements, which may occur to those skilled in the art, without departing from the spirit and scope of the invention defined in the attached claims.

What is claimed is:

1. A method of manufacturing a fluid-filled cylindrical damping assembly comprising:
    a shaft member;
    an intermediate sleeve disposed radially outwardly of the shaft member with a predetermined radial spacing therebetween;
    a main elastic rubber body interposed between the shaft member and the intermediate sleeve, and connecting the shaft member and the intermediate sleeve;
    an outer cylindrical metal member inserted on an outer circumferential surface of the intermediate sleeve, provided a sealing rubber layer on an inner circumferential surface thereof, and being fitted and fixed to the intermediate sleeve;
    an engaging portion formed by radially inwardly bending an end portion of one side in an axial direction of the outer cylindrical metal member;
    an inner flange portion integrally formed at an end portion of the other side in the axial direction of the outer cylindrical metal member; and
    a plurality of fluid chambers provided between the outer cylindrical metal member and the shaft member, defined at least a part of a wall portion thereof by the main elastic rubber body and the sealing rubber layer, and filled with a non-compressible fluid, wherein the engaging portion is engaged with end portion of one side in an axial direction of the intermediate sleeve, while the inner flange portion is contacted to and engaged with an end portion of the other side in the axial direction of the intermediate sleeve, the method comprising the steps of:
    providing an intermediate molded-body formed of an integrally vulcanized product wherein the shaft member and the intermediate sleeve are connected by main elastic rubber body disposed therebetween, and wherein the end portion of the other side in the axial direction of the intermediate sleeve is formed to have a diameter smaller than a diameter of the end portion of the one side in the axial direction of the intermediate sleeve;
    providing a metallic shaped product having a tapered cylindrical shape to provide the outer cylindrical metal member, being formed so that the diameter thereof decreases gradually from the one side in an axial direction towards the other side, and wherein the inner flange portion is integrally formed at the end portion of the small diameter side;
    forming the sealing rubber layer on an inner circumferential surface of the metallic shaped product;
    providing at least one concave groove at an inside surface of the inner flange portion of the metallic shaped product, respectively opening on an inside surface and at an inside in a radial direction, while extending in the radial direction; and
    engaging the engaging portion with an end portion of a large-diameter side of the intermediate sleeve in the non-compressible fluid, wherein the engaging step comprises the steps of:
    inserting the metallic shaped product provided with the at least one concave groove, on an outer circumferential surface of the intermediate molded-body;
    contacting and engaging the inside surface of the inner flange portion of the metallic shaped product with an end surface of the small-diameter side of the intermediate sleeve in the intermediate molded-body;
    performing a diameter-reducing operation on the metallic shaped product after assembling the metallic shaped product and the intermediate molded-body;
    fitting and fixing the metallic shaped product on the intermediate sleeve; and
    forming the engaging portion by means of inwardly bending an end portion of the large-diameter side of the metallic shaped product in the radial direction.

2. The method of manufacturing a fluid-filled cylindrical damping assembly according to claim 1, wherein the sealing rubber layer is provided with a predetermined thickness on the inside surface of the inner flange portion of the metallic shaped product, and the at least one concave groove is formed in a surface opposite to the inner flange portion side of the sealing rubber layer provided on the inside surface of the inner flange portion.

3. The method of manufacturing a fluid-filled cylindrical damping assembly according to claim 1, wherein the diameter-reducing operation for the metallic shaped product after performing an assembling operation of the metallic shaped product and the intermediate molded-body is performed in a manner such that an end portion at a side of the metallic shaped product where the inner flange portion is formed is formed to have a smaller diameter than a diameter of an end portion at a side opposite thereto.

* * * * *